United States Patent [19]

Takehara et al.

[11] Patent Number: 5,096,168

[45] Date of Patent: Mar. 17, 1992

[54] SUSPENSION SYSTEM FOR VEHICLE

[75] Inventors: Shin Takehara; Takeshi Edahiro; Toshiki Morita, all of Hiroshima, Japan

[73] Assignee: Mazda Motor Corporation, Japan

[21] Appl. No.: 677,598

[22] Filed: Mar. 27, 1991

Related U.S. Application Data

[63] Continuation of Ser. No. 429,249, Oct. 30, 1989, abandoned.

[30] Foreign Application Priority Data

Oct. 28, 1988 [JP] Japan ................. 63-273732
Oct. 28, 1988 [JP] Japan ................. 63-273733
Oct. 28, 1988 [JP] Japan ................. 63-273734

[51] Int. Cl.⁵ .................... F16F 3/07; F16F 3/10; F16F 9/48
[52] U.S. Cl. .................... 267/220; 267/152; 267/225; 280/710; 280/716
[58] Field of Search ............ 267/33, 152, 217, 219, 267/220, 221, 225, 250, 252, 253, 64.25; 280/710, 712, 716

[56] References Cited

U.S. PATENT DOCUMENTS

| | | | |
|---|---|---|---|
| 1,655,786 | 1/1928 | Guerritore | 267/217 X |
| 1,703,397 | 2/1929 | Kirk et al. | 267/225 |
| 2,255,370 | 9/1941 | Tydelski, Jr. | 267/250 |
| 2,578,138 | 12/1951 | Janeway et al. | 267/225 X |
| 2,917,303 | 12/1959 | Vierling | 267/225 |
| 3,572,678 | 3/1971 | Jerz, Jr. | 267/225 |
| 4,042,259 | 8/1977 | Fiedler et al. | 267/220 X |
| 4,145,036 | 3/1979 | Moonen et al. | 267/221 |
| 4,154,461 | 5/1979 | Schnittger | 262/225 |
| 4,557,469 | 12/1985 | Jeglitzka et al. | 267/252 |
| 4,822,010 | 4/1989 | Thorn | 267/219 X |

FOREIGN PATENT DOCUMENTS 62-103713 7/1987 Japan .
764594 12/1956 United Kingdom ............... 267/225

*Primary Examiner*—George E. A. Halvosa
*Attorney, Agent, or Firm*—Thompson, Hine and Flory

[57] ABSTRACT

Among two damping devices arranged in series between wheel side members and body side members, while in one damping device spring constant of a spring member is set low and damping coefficient of a damper member is set high, in the other damping device spring constant of a spring member is set high and damping coefficient of a damper member is set low. By this arrangement, difference in damping force between the area of low oscillation frequency and the area of high oscillation frequency can be made large, whereby running stability and comfortableness to ride in can be improved on a high level.

15 Claims, 4 Drawing Sheets

SUSPENSION SYSTEM FOR VEHICLE

This is a continuation of co-pending application Ser. No. 07/429,249 filed Oct. 30, 1989, now abandoned.

BACKGROUND OF THE INVENTION

1. Field of the Invention

This invention relates to a suspension system for vehicles and more particularly to a suspension system in which two damping devices are arranged in series between wheel side members and body side members.

2. Description of the Prior Art

In general, in the vehicle suspension system a damping device comprising a spring member (coil spring, etc.) and a damper member (shock absorber, etc.) is arranged between the wheel side members and the body side members for controlling the oscillation of wheels. As to the damping force of a damper member of this damping device, for the purpose of improving running stability and comfortableness to ride in it is considered desirable to make damping force larger at the area of low oscillation frequency, namely, the area of oscillation frequency caused by the operation of a driver (2-3 Hz or less) and to make damping force smaller at the area of high oscillation frequency, namely, the area of oscillation frequency caused by the road surface stimulus, etc. (about 5 Hz or higher). For this purpose, it has been known to use a shock absorber of damping force variable type for the damper member but this shock absorber has disadvantages in that it is complicated in the composition of its control part, etc., high in manufacturing cost and lacks responsiveness.

Also, it has been known to arrange two damping devices in series, each comprising a shock absorber and a coil spring, between the wheel side members and the body side members, as disclosed by the Japanese Utility Model Registration Application Laying Open Publication No. 62-103713 (damping device of this kind is hereinafter referred to as multi-damper). In this case of this multi-damper, if it is so set that damping coefficients of shock absorbers in the two damping devices are different, it is possible to change damping force into two values according to the oscillation frequency. In the Publication No. 62-103713, a shock absorber of damping force variable type is used for one of two damping devices.

Damping force by the shock absorber is not determined only by the damping coefficient but relates to the length, speed, etc. of expansion and contraction by the shock absorber. Therefore, in the multi-damper mentioned above, the easygoing combination of the shock absorber and the coil spring (two shock absorbers of different damping coefficient and two coil springs of the same spring constant, for example) does not present a big difference in damping force between the area of low oscillation frequency and the area of high oscillation frequency and cannot improve the running stability and comfortableness to ride in on a high level.

SUMMARY OF THE INVENTION

The present invention has for its object to improve the running stability and comfortableness to ride in by making larger the difference in damping force between areas of low oscillation frequency and high oscillation frequency through a proper combination of two damper members of different damping coefficient with two spring members of different spring constant.

In order to attain the above object, the present invention makes it its prerequisites that a suspension system for a vehicle comprises two damping devices arranged in series between the wheel side members and the body side members and each of the damping devices is composed of a spring member and a damper member arranged in parallel. Also, while in the first damping device spring constant of the spring member is set low and the damping coefficient of the damper member is set high, in the second damping device spring constant of the spring member is set high and the damping coefficient of the damper member is set low.

Under the above composition, when the oscillation frequency is at a low area, damper members of the two damping devices work and generate damping force. At this time, in the first damping device the damping member of high damping coefficient, together with the spring member of low spring constant, reciprocates between a comparatively long distance and therefore very big damping force is generated. Thus, very large damping force can be obtained at the area of low oscillation frequency and the running stability can be improved on a high level.

On the other hand, at the area of high oscillation frequency the damper member of high damping coefficient does not work but only the damper member of low damping coefficient works and generates damping force. At this time, the spring member which is arranged in parallel with the damper member of low damping resistance and constitutes the second damping device oscillates and generates spring force. However, since the spring constant of the spring member is set high, amplitude and spring force of the spring member are very small at the area of high oscillation frequency. This spring force does not have a bad effect on comfortableness to ride in and thus comfortableness to ride in can be improved on a high level.

The above and other objects, characteristics and advantages of the present invention will become more apparent from the following description of the preferred embodiments made with reference to the accompanying drawings.

BRIEF DESCRIPTION OF THE DRAWINGS

The attached drawings show preferred embodiments of the present invention, in which:

FIG. 1 to FIG. 3 show the first embodiment of the present invention, of which FIG. 1 is a front view, partially broken away, of the whole composition of a suspension system; FIG. 2 is a side view, in longitudinal section, of a multi-damper; and FIG. 3 is a drawing showing the damping force characteristics of the multi-damper;

FIG. 5 to FIG. 7 show the second embodiment of the present invention, of which FIG. 5 is a vertical section of a liquid bush; FIG. 6 is a drawing showing the damping force characteristics of the liquid bush; and FIG. 7 is a drawing showing the damping force characteristics of the suspension system as a whole.

DETAILED DESCRIPTION OF THE INVENTION

A description is made below of the preferred embodiments of the present invention, with reference to the accompanying drawings.

Figure 1:
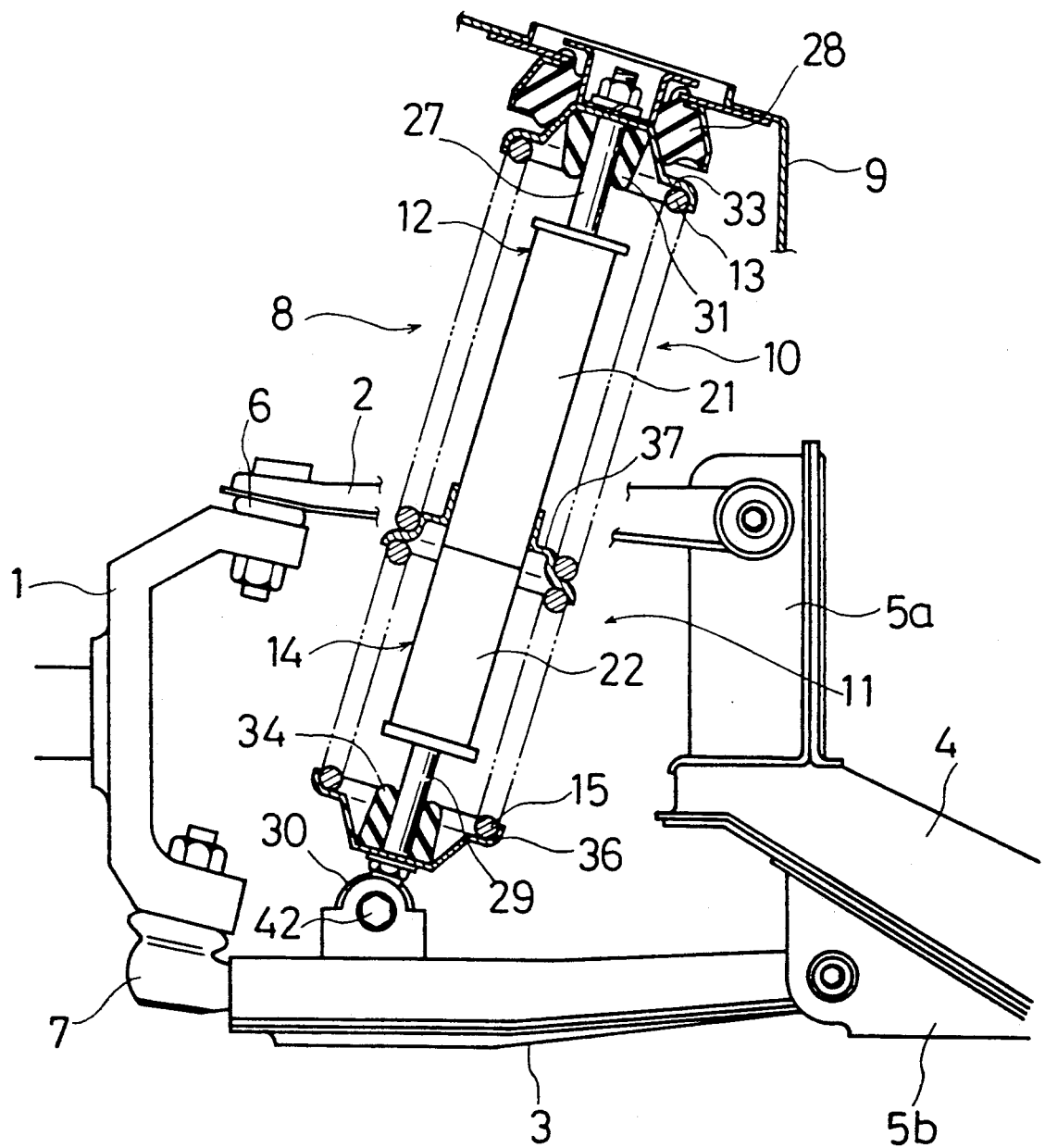
Figure 2:
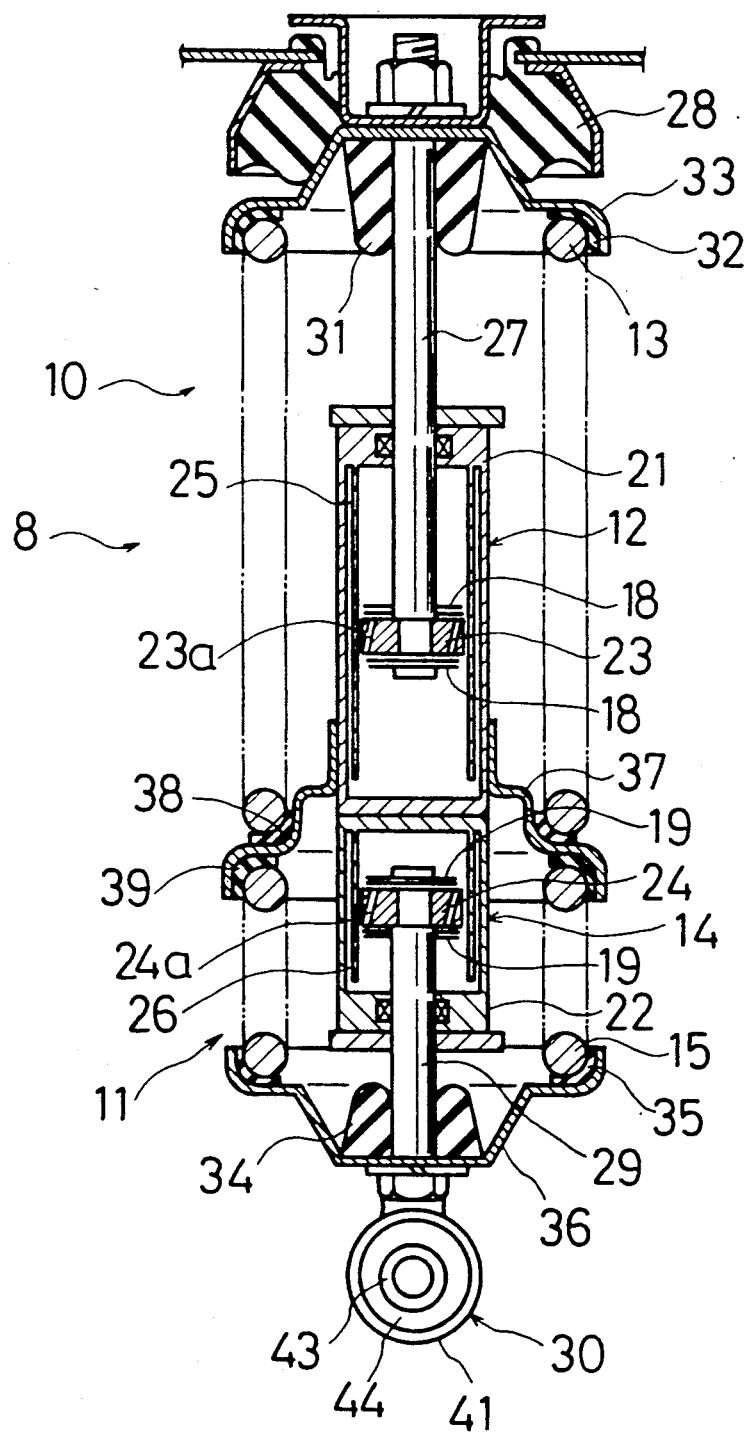

FIG. 1 and FIG. 2 show a suspension system for a vehicle according to the first embodiment of the present invention.

In FIG. 1, reference numeral 1 designates a wheel support member which supports wheels (not shown in the drawing) rotatably. Reference numerals 2 and 3 designate an upper arm and a lower arm respectively, each comprising an A type arm arranged in width direction of a vehicle. While inner end portions of both arms 2, 3 are connected swingably up and down to a cross member 4 which is a strength member of a body through the medium of brackets 5a, 5b etc., outer end portions are connected to an upper part or a lower part of the wheel support member 1 through the medium of ball joints 6, 7.

Reference numeral 8 designates a multi-damper arranged substantially in vertical direction between the lower arm 3 of wheel side members and a body panel 9 of wheel side members. The multi-damper 8 comprises two damping devices 10, 11 arranged in series. Of these two damping devices 10, 11, the first damping device 10 located upward comprises a shock absorber 12 which is a damper member and a coil spring 13 which is a spring member arranged in parallel with and at the outer circumference of the shock absorber 12. Similarly to the damping device 10, the second damping device 11 located downward comprises a shock absorber 14 and a coil spring 15 located in parallel with each other.

Constructions of the multi-damper 8 and damping devices 10, 11 are illustrated in detail in FIG. 2. Shock absorbers 12, 14 of the two damping devices 10, 11 are connected with each other by joining tubes 21, 22 thereof. Pistons 23, 24 having throttle holes 23a, 24a respectively are put slidably in tubes 21, 22. Formed at the outer wall parts of the tubes 21, 22 are rooms 25, 26 which allow the capacity variation in the tubes 21, 22 in connection with the sliding of the pistons 22, 24 (up and down movement of the piston rods 27, 29 to be stated later.)

One end portion (a lower end portion) of the piston rod 27 is connected to the piston 23 of the shock absorber 12 and the outer end portion (an upper end portion) of the piston rod 27 extends above the tube 21 and is fitted to the body panel 9 through the medium of a rubber mount 28. One end portion (an upper end portion) of the piston rod 29 is connected to the piston 24 of the shock absorber 14 and the other end portion (a lower end portion) of the piston 29 extends below the tube 22 and is connected to the lower arm 3 through the medium of an elastic bush 30 and a support axis 42. Mounted at the piston rod 27 or 29 at the place adjacent the piston 23 or 24 is an adjust spring 18 or 19 which varies a throttle rate of its throttle hole 23a or 24a to make damping resistance of each shock absorber 12, 14 adjustable. The elastic bush 30 comprises an outer tube 41, an inner tube 43 and a rubber 44 filled therebetween.

Mounted at an upper end portion of the piston rod 27 of the upper shock absorber 12 are a stopper rubber 31 which controls the contractile movement of the shock absorber 12 (namely, upward movement of the tube 21 in relation to the piston rod 27) and a first spring sheet 33 which supports an upper end of the coil spring 13 through the medium of a rubber sheet 32. Mounted at a lower end portion of the piston rod 29 of the lower shock absorber 14 are a stopper rubber 34 which controls the contractile movement of the shock absorber 14 (namely, upward movement of the piston 24 and the piston rod 29 in relation to the tube 22) and a second spring sheet 36 which supports a lower end of the coil spring 15 through the medium of a rubber sheet 35. A third spring sheet 37 is mounted adjacent the part where tubes 21, 22 of the shock absorbers 12, 14 join. A lower end of the coil spring 13 and an upper end of the coil spring 15 are supported to the spring sheet 37 through the medium of a rubber sheet 38 or 39.

The spring constant of the coil spring 13 in the first damping device 10 is set low by making the number of coils of the coil spring 13 comparatively many and the damping coefficient of the shock absorber 12 is set high. On the other hand, the spring constant of the coil spring 15 in the second damping device 11 is set high by making the number of coils of the coil spring 15 comparatively few and the damping coefficient of the shock absorber 14 is set low. As compared with the upper shock absorber 10 having high damping resistance, the lower shock absorber 11 having low damping coefficient is set comparatively short in an expansion and contraction stroke of the piston rod 29 due mainly to the length of the tube 22 in axial direction and arrangement position of the stopper rubber 34.

An explanation is made about the action and effect of the first embodiment.

When a low oscillation frequency is generated from the vehicle body side on the basis of the operation of a driver on the occasion of running mountain roads, for example, pistons 23, 24 of the shock absorbers 12, 14 of the two damping devices 10, 11 composing the multi-damper 8 reciprocally slide in the tubes 21, 22 with the oscillation of the vehicle body and fluid (oil or the like) in the tubes 21, 22 flows through the throttle holes 23a, 24a of the pistons 23, 24, whereupon the damper function (periodic damping function) is displayed by flowing resistance at the throttle holes 23a, 24a. At this time, of the two damping devices 10, 11, in the first damping device 10 the shock absorber 12 of the high damping coefficient, together with the coil spring 13 of low spring constant, expands and contracts between a comparatively long distance and therefore very large damping force is generated.

On the other hand, when high oscillation frequency (for example, road noise) is generated from the vehicle wheel side on the occasion of straight driving, for example, among the two damping devices 10, 11 composing the multi-damper 8, since the shock absorber 12 of the first damping device 10 is set high in its damping coefficient, i.e., large in the throttle rate of the throttle hole 23a of the piston 23, fluid in the tube 21 cannot flow through the throttle hole 23a and damper function cannot be displayed. Thus, only the shock absorber 14 of low damping coefficient in the second damping device 11 displays damper function. The coil spring 15 which, together with the shock absorber 14, composes the second damping device 11 displays spring force due to expansion and contraction displacement but the displacement amplitude is very small and only slight spring force is generated. Thus, no unfavorable effect is given to the comfortableness to ride in.

Figure 3:
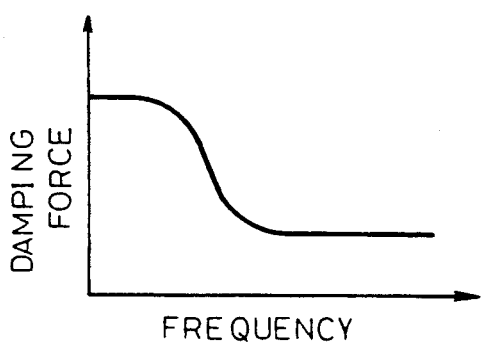

From the above, it can be said that the damping force of the multi-damper 8, as shown in FIG. 3, becomes large at the area of low oscillation frequency and small at the area of high oscillation frequency and the difference in oscillation frequency between the two area becomes very large. Therefore, it is possible to improve groundability and running stability on the occasion of running bad roads and to improve comfortableness to ride in on the occasion of running good roads, both on a high level.

When a big input acts on wheels on the occasion of a vehicle running on the difference in level, small projections, etc. at the road surface in running at high speed, for example, the lower shock absorber 14 of low damping coefficient contracts first. The piston rod 29 of this shock absorber 14 is short in the expansion and contraction stroke and therefore the undersurface of the tube 22 comes in contact with the stopper rubber 34 earlier and the contractile movement is controlled. On the other hand, the upper shock absorber 12 of high damping coefficient contracts at an early stage and displays large damping force. Therefore, a shock on the occasion of a big input can be relieved and reduced to a large extent and comfortableness to ride in can be improved.

Moreover, as the multi-damper 8 has two shock absorbers 12, 14 which are joined by tubes 21, 22 and its intermediate part in lengthwise direction comprises tubes 21, 22 which are stronger to the bending load than piston rods 27, 29, flexural strength can be obtained fully.

Figure 4:
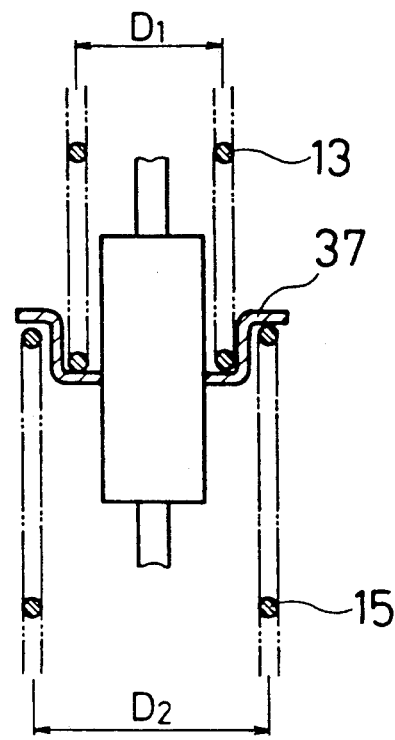
FIG. 4 is a side view of a part of the multi-damper of a modified example.

In the first embodiment, for the purpose of making the spring constants of the coil springs 13, 15 of the two damping devices 10, 11 different from each other, difference was made in the number of coils between the two coil springs. Alternatively, difference may be made in the diameter of coil as shown in FIG. 4. The spring constant of the coil spring 13 of smaller coil diameter $D_1$ is lower than that of the coil spring 15 of larger coil diameter $D_2$. In this case, two coil springs 13, 15 which are supported by a spring sheet 37 disposed at the tube of the shock absorber can be arranged at the outer circumference of the corresponding shock absorber, with their end portions overlapping each other. This results in shortening the length of the multi-damper in axial direction.

As to the damper member which comprises the damping device 10, 11, a hydro-pneumatic suspension system comprising a hydraulic cylinder to which a gas spring is connected or other type can safely be used, as well as the shock absorber 12, 14 in the embodiment. As to the spring member, members other than the coil spring 13, 15 can be used.

In the first embodiment, damping force of the multi-damper 8 was made low, without variation, at the area of high oscillation frequency (refer to FIG. 3) but it is desirable to make damping force larger at the resonance point of wheel side members (about 10–15 Hz) even in the area of high frequency oscillation for the purpose of avoiding the bouncing of wheels. Therefore, it is necessary to provide a third damper member for damping oscillation on the wheel side at the resonance point of the wheel side member, in addition to the two damper members (shock absorber 12, 14) composing the multi-damper 8. This third damper member is provided on the lower arm 3 and is composed of a dynamic damper in which mass body is supported by the spring member or may be composed by providing the liquid bush, in place of the elastic bush 30, at the part where the lower arm 3 and the shock absorber 14 join.

Figure 5:
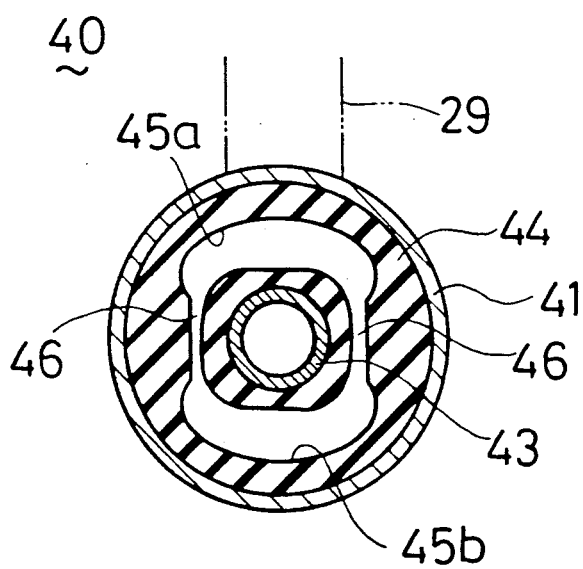

FIG. 5 shows the case where the third damper member is composed by a liquid bush 40 as the second embodiment of the present invention. The fluid bush 40 has an outer tube 41 fixed to a lower end of the piston rod 29 of the shock absorber, an inner tube 43 which is arranged concentrically with the outer tube 41 and is connected to the lower arm through the medium of a support axis 42 (refer to FIG. 1) and a rubber 44 filled and fixed between the outer tube 41 and the inner tube 43. Formed in the rubber 44 are liquid rooms 45a, 45b in which liquid such as oil is enclosed at the part which is on extension lines of the piston rod 29 with the inner tube 43 therebetween and throttle holes 46 which make both liquid rooms 45a, 45b communicate with each other. It is so adapted that liquid in the liquid rooms 45a, 45b flows through the throttle holes 46 on the occasion of oscillation of the designated frequency. Due to flowing resistance at this time, damping force in relation to oscillation is generated. The oscillation frequency at flowing is so set that it conforms substantially to the resonance point of wheel side members and the liquid bush 40 damps the oscillation at the resonance point of wheel side members.

Figure 6:
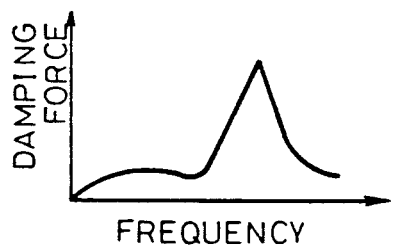
Figure 7:
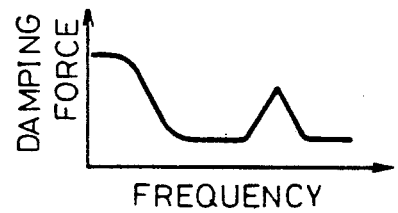

FIG. 6 shows the relation between the damping force of the liquid bush 40 and the oscillation frequency and FIG. 7 shows the relation between the damping force of the suspension system as a whole including the liquid bush 40 and the oscillation frequency. As can be seen from these figures, in the case of the second embodiment the damping force in relation to the oscillation displayed by the suspension system as a whole is large at the area where oscillation frequency is basically low and is small at the area where oscillation frequency is high. Therefore, running stability when a vehicle is running bad roads, for example, and comfortableness to ride in when a vehicle is running good roads, for example, can be improved. As large damping force is obtained at the resonance point of wheel side members within the area of high oscillation frequency, it is possible to check bouncing of wheels and to maintain groundability in good condition.

Figure 8:
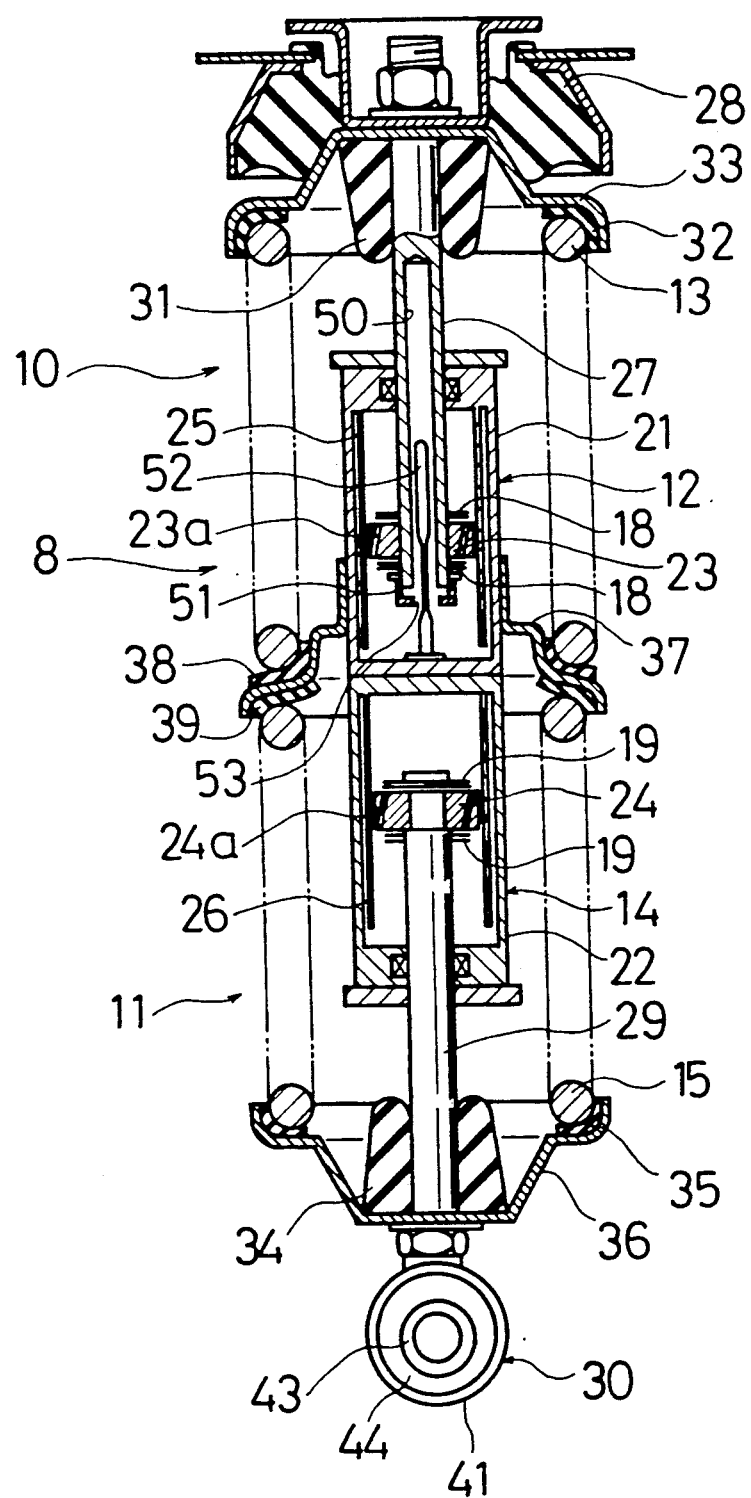
FIG. 8 shows the third embodiment of the present invention, corresponding to FIG. 2.

FIG. 8 shows a modified example of the multi-damper 8 as the third embodiment of the present invention. In the case of this multi-damper 8, contrary to the case of the first embodiment, while spring constant of the coil spring 13 in the upper damping device 10 is set high and damping coefficient of the shock absorber 12 is set low, spring constant of the coil spring 15 in the lower damping device 11 is set low and damping coefficient of the shock absorber 14 is set high.

The lower shock absorber 14 of high damping coefficient is a shock absorber of constant damping coefficient, but the upper shock absorber 12 of low damping coefficient is a shock absorber of stroke dependent type which is so designed that the damping coefficient increases in two stages as the expansion and contraction stroke of the piston rod 27 becomes longer. The piston rod 27 of the shock absorber 12 has a hollow part 50 extending from its lower end surface (end surface of the side connecting with the piston 23) upwardly along the axial center and a throttle annular member 51 which is fitted to the entrance of the hollow part 50. Provided in the tube 21 of the shock absorber 12 is a throttle cylinder form member 52 extending in the hollow part 50 of the piston rod 27 through the throttle annular member 51. The diameter of the throttle cylinder form member 52 is so set that it is thin at its middle part in lengthwise direction and thick at its both end portions. The throttle cylinder form member 52 and the throttle annular member 51 forms therebetween a throttle 53 and the throttle rate of this throttle 53 is low when the expansion and contraction stroke of the piston rod 27 is short (when the throttle is formed at the middle part of the throttle cylinder form member 52 having a thin diameter) and is high when the expansion and contraction stroke of the piston rod 27 is long (when the throttle is formed at both end portions of the throttle cylinder form member 52 having a thin diameter).

The damping coefficient of the stroke dependent type shock absorber 12 is determined by the throttle rate at the throttle hole 23a of the piston 23 and the throttle rate at the throttle 53. The damping coefficient of the shock absorber 12 is fairly smaller than that of the lower shock absorber 14 when the expansion and contraction stroke of the piston rod 27 is short but when the expansion and contraction stroke of the piston rod 27 is long, the damping coefficient of the shock absorber 12 is only slightly smaller than that of the lower shock absorber 14. The other compositions of the multi-damper 8 are the same as in the case of the first embodiment and like symbols are given to the same members and explanation of them is omitted.

In the case of the third embodiment, when a vehicle rides on small projections and large input acts on wheels, for example, the upper shock absorber 12 of low damping coefficient contracts first but this shock absorber 12 is of stroke dependent type and when the expansion and contraction stroke of its piston rod 27 exceeds the designated value, fairly large damping force is generated and therefore, similarly to the case of the first embodiment, shock at the time of large input can be relieved and reduced to a large extent. Similarly to the case of the first embodiment, it is a matter of course that groundability and running stability at the time of running bad roads can be improved and comfortableness to ride in at the time of running good roads can be improved, both on a high level.

What is claimed is:

1. A suspension system for a vehicle of the type having a wheel side member and a body side member, two damping devices comprising:
   a first spring member having a first spring constant;
   a first, fluid-filled damping member having a first damping coefficient, said first damping member being mounted in parallel with said first spring member and including a first tube, a first piston mounted within said first tube and first throttle means for fluid movement in said first tube around said first piston, said first piston being connected for displacement in response to displacement of said wheel side member;
   a second spring member having a second spring constant less than said first spring constant and being mounted in series with said first spring member and said first damping member; and
   a second fluid-filled self-contained damping member having a second damping coefficient greater than said first damping coefficient, said second damping member being mounted in parallel with said second spring member and in series with said first spring member and said first damping member, said second damping member including a second tube, a second piston mounted within said tube and second throttle means for fluid movement in said second tube around said second piston, said second piston being connected for displacement in response to displacement of said wheel side member;
   whereby low frequency vibrations transmitted to said body side member from said wheel side member are absorbed and damped by said first spring and damping member, and high frequency vibrations transmitted to said body side member from said wheel side member are absorbed and damped by said second spring and damping member.

2. A suspension system for vehicles as defined in claim 1, wherein each damper member of each damping device is composed by a shock absorber which comprises said tube in which liquid is filled, and said piston is fitted in said tube slidably and having a throttle hole, and a piston rod with one end thereof connected to said piston.

3. A suspension system for vehicles as defined in claim 2, wherein two shock absorbers, each composing a damper member of each damping device, are provided by connecting their tubes with each other and a piston rod of one of the shock absorbers is connected to the body side member and a piston rod of the other shock absorber is connected to the wheel side member.

4. A suspension system for vehicles as defined in claim 3, wherein a room which allows capacity variation in the tube with the sliding of the piston is provided at the outer wall part of the tube of each shock absorber.

5. A suspension system for vehicles as defined in claim 3, wherein each shock absorber comprises an adjust member which makes the damping coefficient adjustable by changing the throttle rate of the throttle hole.

6. A suspension system for vehicles as defined in claim 3, wherein the spring member of each damping member is composed by a coil spring arranged at the outer circumference of each shock absorber and one end of each coil spring is supported by a spring sheet provided at a piston rod of each shock absorber and the other end is supported by a spring sheet provided at the tube.

7. A suspension system for vehicles as defined in claim 6, wherein spring constants of the two coil springs are set different by differentiating the number of coiling of said both coil springs.

8. A suspension system for vehicles as defined in claim 6, wherein spring constants of the two coil springs are set different by differentiating the diameter of coil of said both coil springs.

9. A suspension system for vehicles as defined in claim 8 wherein said spring sheet provided at the tube comprises an inner, annular portion seating said spring member having a smaller coil diameter, and an outer annular portion seating said spring member having a larger coil diameter, said outer annular portion being offset from said inner annular portion along a length of said tube such that said smaller coil diameter spring member is partially rested within said larger coil diameter spring member.

10. A suspension system for vehicles as defined in claim 2, further comprising a third damping member having a third damping coefficient selected to damp oscillation at a resonance point of said wheel side members, whereby vibration transmitted from said wheel side members to said body side members is reduced during riding on both rough and smooth roads.

11. A suspension system for vehicles as defined in claim 10, wherein the third damper member is composed by a liquid bush provided at a connecting part of the wheel side members with one of the shock absorbers, said liquid bush comprises two liquid rooms which are provided in a rubber filled in between an outer tube and an inner tube, and a throttle hole which makes said two liquid rooms communicate with each other.

12. A suspension system for vehicles as defined in claim 10, wherein the third damper member is composed by a dynamic damper which supports a mass body on the wheel side member by a spring member.

13. A suspension system for vehicles as defined in claim 2, wherein the shock absorber of low damping coefficient among two shock absorbers composing a damper member of each damping device is of stroke dependent type which increases damping coefficient gradually as the expansion and contraction stroke of the piston rod becomes longer.

14. A suspension system for vehicles as defined in claim 13, wherein a stroke dependent type shock absorber comprises a hollow part formed at the piston rod from the end surface of the side connecting with the piston along the axial center, a throttle annular member provided at the entrance of said hollow part, and a throttle cylinder form member which is fixed to the tube and extends in said hollow part through said throttle annular member, diameter of said throttle cylinder form member is thin at the middle part thereof in lengthwise direction and thick at both end portions thereof in lengthwise direction and the throttle rate of a throttle formed between the throttle cylinder form member and said throttle annular member varies in high and low two stages according to the length of expansion and contraction stroke of the piston rod.

15. A suspension system for vehicles as defined in claim 2, wherein the shock absorber of low damping coefficient among two shock absorbers composing a damper member of each damping device is set short in the expansion and contraction stroke of the piston rod.

* * * * *